United States Patent [19]
Costantini et al.

[11] Patent Number: 5,506,898
[45] Date of Patent: Apr. 9, 1996

[54] EXPECTED WAIT-TIME INDICATION ARRANGEMENT

[75] Inventors: Ralph J. Costantini, Morganville, N.J.; Andrew D. Flockhart, Thornton, Colo.; Cecil W. Maccannon, Jr., Plainfield, N.J.; James L. Murtaugh, III, Lincroft, N.J.; Carol Santagato, Eatontown, N.J.; Minh D. Tran, Tinton Falls, N.J.

[73] Assignee: AT&T Corp., Murray Hill, N.J.

[21] Appl. No.: 273,667

[22] Filed: Jul. 12, 1994

[51] Int. Cl.$^6$ .............. H04M 3/00; H04M 1/64; H04Q 3/64; G06G 7/48
[52] U.S. Cl. .............. 379/266; 364/554; 364/569; 379/88; 379/309
[58] Field of Search .............. 379/67, 88, 89, 379/265, 266, 309; 364/554, 556, 569

[56] References Cited

U.S. PATENT DOCUMENTS

| | | | |
|---|---|---|---|
| 4,788,715 | 11/1988 | Lee | 379/84 |
| 4,953,204 | 8/1990 | Cuschleg, Jr. et al. | 379/266 |
| 5,025,468 | 6/1991 | Sikand et al. | 379/266 X |
| 5,206,903 | 4/1993 | Kohler et al. | 379/309 |
| 5,214,688 | 5/1993 | Szlam et al. | 379/67 |

Primary Examiner—Jeffery Hofsass
Assistant Examiner—Harry S. Hong
Attorney, Agent, or Firm—David Volejnicek

[57] ABSTRACT

In an automatic call distribution (ACD) system, an improved estimated waiting time arrangement derives a more accurate estimate of how long a call that is or may be enqueued in a particular queue will have to wait before being serviced by an agent, by using the average rate of advance of calls through positions of the particular queue. For a dequeued call, the arrangement determines the call's individual rate of advance from one queue position to the next toward the head of the queue. It then uses this individual rate to recompute a weighted average rate of advance through the queue derived from calls that preceded the last-dequeued call through the queue. To derive a particular call's estimated waiting time, the arrangement multiplies the present weighted average rate of advance by the particular call's position number in the queue. The arrangement may be called upon to update the derivation at any time before or while the call is in queue. Also, the arrangement performs the estimated waiting time derivation separately and individually for each separate queue. The arrangement advantageously takes into consideration the effect of ACD features that affect the estimated waiting time, including changes in the numbers of agents that are serving the queue due to agent login and logout, multiple split/skill queuing, agents with multiple skills or in multiple splits, priority queuing, interflow, intraflow, and call-abandonment rates.

19 Claims, 2 Drawing Sheets

5,506,898

EXPECTED WAIT-TIME INDICATION ARRANGEMENT

TECHNICAL FIELD

This invention relates to queuing arrangements, for example to telephone call-answering arrangements and automatic call-distribution arrangements in telecommunications systems.

BACKGROUND OF THE INVENTION

In automatic call-distribution (ACD) systems, calls incoming to a call center are answered and handled by a plurality of agents. The ACD system automatically distributes and connects incoming calls to whatever agents are suited to handling the calls and are free, that is, not handling other calls at the moment.

It often happens that the call center becomes overloaded by calls, so that no suitable agents are available to handle calls at the moment that the calls come in. The calls then back up. They are placed in different queues based upon some preestablished criteria, and are placed in each queue in the order of their arrival and/or priority. There they await suitable agents becoming free and available to service them. Unfortunately, in such a situation, callers often abandon their calls without waiting for their calls to be serviced. This normally results in loss of goodwill, business, and cost of the call, for the called party. Information on how long either an individual or an average caller has to wait to have his or her call serviced is crucial information for the service provider. It is often the most important factor for deciding how to treat the call, and thus serves as a crucial tool for customizing customer service. For example, it has been found that rates of call abandonment of backed-up calls are reduced by giving the callers whose calls are being enqueued an indication of how long they will have to wait to have their calls serviced. Estimated waiting time is also an important measure of the service provider's performance.

Numerous techniques have been developed over time to estimate a call's wait-time in queue. One estimation technique uses the average wait-time to answer of some number of previous calls that had been placed in the queue. Another estimation technique uses the wait time of the oldest call in the queue. Yet another estimation technique uses, as the wait-time estimate, the number of calls in the queue multiplied by the average time it takes an agent to handle a call, divided by the number of agents available to handle the calls. While giving a general prediction of a call's wait time in queue, none of these estimation techniques provide an acceptable level of accuracy, due to their failure to take into account the full feature functionality of the ACD system. Examples of ACD features that affect the expected wait time include priority queuing, multiple split/skill queuing, numbers of agents in multiple splits/skills, interflow, intraflow, and agent login/logout. Rates of call abandonment also significantly affect the expected wait time. Also, the known estimation techniques often give the expected wait-time indication only when the call is first placed in the queue, and do not permit re-computation and re-indication of the expected wait time after the call has been in queue for some time. A reason for these limitations is that expected wait-time computation uses up precious computing power, and the existing wait-time computation schemes have been complex and computationally inefficient so that they have used too much of that precious resource.

SUMMARY OF THE INVENTION

This invention is directed to solving these and other disadvantages of the prior art. According to the invention, an improved estimated waiting time arrangement for a queue of items—such as calls, people, orders, etc.—or for an individual item that is about to be or has been enqueued, derives a more accurate estimate of how long an item would or will have to wait in a particular queue before being serviced, by using an approximate (e.g., average) rate of advance of items through positions of the particular queue. To estimate the queue or item waiting time (that is, the expected or average waiting time of items in a queue, or the expected waiting time of a particular item in a queue, respectively), the arrangement determines an approximate amount of time that any item in the queue takes to advance a position in the queue toward the head of the queue, and then multiplies the determined approximate amount of time by the position that a particular item (i.e., a particular enqueued item, or a next item to be enqueued in that queue) does or would occupy in the queue. This multiple is then reported as the estimated waiting time to a requestor, for example, to the service provider or to an announcement system that announces it to the individual who is waiting to be served. The service provider or individual thus obtains a more accurate estimate of in-queue waiting time than has heretofore generally been possible. Also, the arrangement may periodically be called upon to update the waiting time estimate while the item is in queue, in order to give the individual updated accurate estimated waiting time announcements. The arrangement is computationally simple, and hence the relatively-small amount of computational power required for accurate and repeated wait-time estimation can generally be spared.

The arrangement preferably performs the waiting time estimation separately and individually for each separate queue in a multi-queue system, such as a multi-split ACD system. Each priority level may also be treated as a separate queue in such a system. This provides callers whose calls are enqueued in different queues with waiting time estimates that are based on the particular conditions being experienced by their corresponding ACD splits or priorities. The waiting-time estimates for the individual queues may also be reported to a call-management system (CMS), a call-routing system, a call-vectoring system, an announcement system, etc. Through use that is made of this information by these systems, the waiting times of calls having different priorities or destined for different splits may be monitored both in real time and on a historical basis, and calls may be vectored (routed and rerouted) to different splits or even to different ACDs based upon the expected waiting times being experienced at different splits or ACDs. The arrangement thus advantageously takes into consideration the effect of ACD features that affect the estimated waiting time, including changes in the numbers of agents that are serving the queue due to agent login and logout, multiple split/skill queuing, agents with multiple skills or in multiple splits, priority queuing, interflow, intraflow, and call-abandonment rates.

These and other advantages and features of the invention will become more apparent from the following description of an illustrative embodiment of the invention taken together with the drawing.

DETAILED DESCRIPTION

Figure 1:
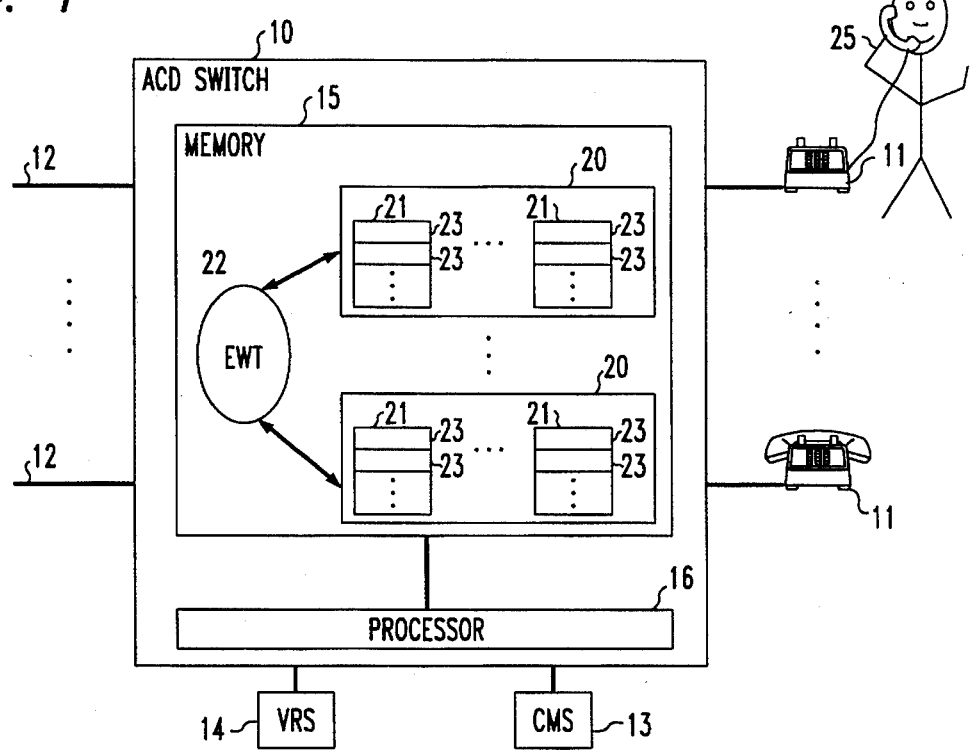
FIG. 1 is a block diagram of a call center that includes an illustrative embodiment of the invention.

FIG. 1 shows an illustrative call center that comprises an automatic call-distribution (ACD) switch 10 serving a plurality of agent stations 11 at least some of which are staffed by agents 25. ACD switch 10 is connected to a plurality of trunks 12 over which it receives incoming calls. It then distributes and connects these calls to stations 11 of available agents 25 based on a set of predetermined criteria. The call center of FIG. 1 is illustratively the subscriber-premises equipment disclosed in Kohler et al. U.S. Pat. No. 5,206,903, which is hereby incorporated herein by reference.

ACD switch 10 is also served by a pair of adjunct processors 13 and 14. Call management system (CMS) 13 provides a call accounting, reporting, and management capability, and a voice response system (VRS) 14 provides an announcements capability. Both adjunct processors 13 and 14 are conventional. CMS 13 is illustratively the AT&T CMS, and 14 is illustratively the AT&T Conversant® VRS. As is conventional, ACD system 10 is a stored-program-controlled unit that includes a memory 15 for storing programs and data, and a processor 16 for executing the stored programs and using the stored data in their execution. The memory includes a plurality of sets 20 of call queues 21. Each set 20 of call queues 21 conventionally serves and holds calls for a different split or skill group of agents. Within each set 20 of call queues 21, each queue 21 holds calls of a different priority. Calls are assigned different priorities in a known manner based upon some predefined criteria such as, for example, whether the caller is an unknown person, a regular account holder, or a preferred customer. Each queue 21 functions as a first-in, first-out (FIFO) buffer memory, and includes a plurality of entries, or positions 23, each for identifying a corresponding one enqueued call. The position 23 at the head of queue 21 is considered to be position number 1, the next subsequent position 23 in queue 21 is considered to be position number 2, etc.

According to the invention, memory 15 further includes an estimated wait time (EWT) function 22. As its name implies, this function determines an estimate of how long a call that is placed in a queue 21 will have to wait before being connected to a station 11 for servicing. The estimate is derived separately by EWT function 22 for each queue 21 of each set 20. It is based on the average rate of advance of calls through positions 23 of the calls' corresponding queue 21. The principles of operation of EWT function 22 are diagrammed in FIGS. 2–5.

Figure 2:
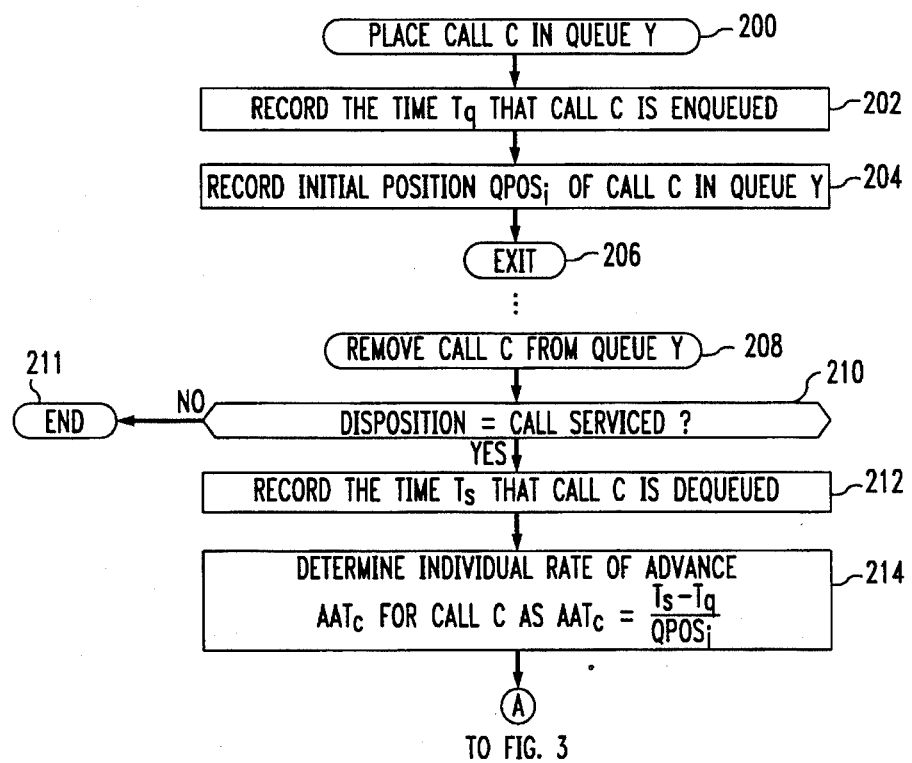
FIGS. 2–5 are a flow diagram of the expected wait-time indication function of the ACD system of the call center of FIG. 1.

Execution of function 22 is invoked for each new call being placed in a queue 21, at step 200 of FIG. 2. For each newly-enqueued call, function 22 records the time $T_q$ when the call is placed in a queue 21, at step 202, and the initial position $QPOS_i$ of the new call in that queue 21, at step 202. The recorded initial position is the number of the position 23 occupied by the newly-enqueued call in the particular queue 21 (be it the total ACD queue, the skill queue, or the priority queue); it indicates how many calls there are in the queue 21 ahead of the new call at the time that the new call is enqueued. Function 21 then temporarily exits execution for that call, at step 206.

Execution of function 22 is again invoked for each call being removed from a queue 21, at step 208. For each dequeued call, function 22 determines the call's disposition, at step 210; function 22 determines whether the call has been connected to a station 11 to be serviced by an agent 25 serving that queue 21, whether the call has been abandoned, or whether it has been vectored (transferred) to another queue. If the call has been removed from queue 21 for any reason other than being connected to an agent 25 serving that queue 21, function 22 ends its operations with respect to this call. This call's effect on estimated waiting time will be reflected in a relatively more rapid advance of calls that follow it in the queue through the positions of the queue. If the call has been connected to a station 11 to be serviced, function 22 notes the time $T_s$ when the call has been dequeued, at step 212. Function 22 then determines the individual rate of advance (average advance time, or $AAT_c$) for that call from one position 23 to the next through queue 21, by subtracting the time $T_q$ when the call was enqueued from the time $T_s$ that the call was dequeued and dividing the difference by the call's initial position $QPOS_i$ in queue 21, at step 214.

Figure 3:
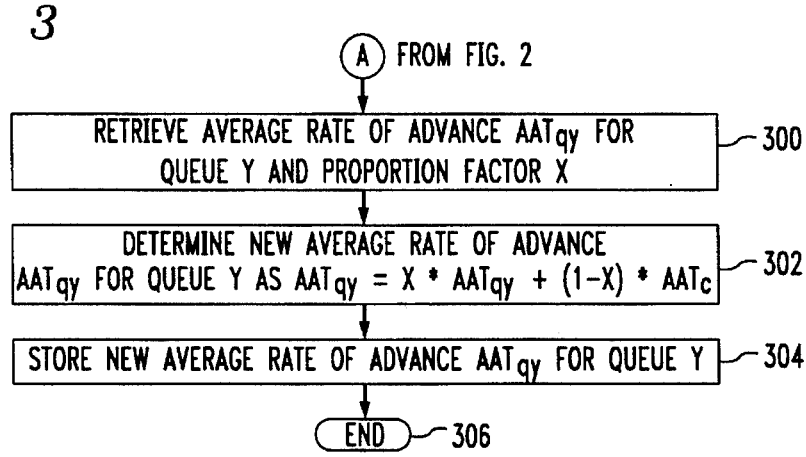

Function 22 then uses the dequeued call's individual rate of advance $AAT_c$ to adjust the queue's average rate of advance, as shown in FIG. 3. Function 22 retrieves a stored average rate of advance $AAT_{qy}$ for queue 21, and a proportion factor X, at step 300. The stored average rate of advance $AAT_{qy}$ will have been computed by function 22 for calls that have been dequeued from this queue 21 prior to the subject (last-dequeued) call, in the manner shown in FIGS. 2–3. Proportion factor X is a tunable parameter that indicates the weight that is to be assigned to the individual rate of advance $AAT_c$ of the last-dequeued call in affecting the average rate of advance $AAT_{qy}$ for that queue 21. Weighting factor X can vary within the range from zero to one. Its value is empirically determined, and in one illustrative example it has been found to be preferably within the range of 0.95 to 0.97. Having retrieved the stored values at step 300, function 22 now determines a new, up-to-date, average rate of advance $AAT_{qy}$ for the queue 21 by multiplying the retrieved average rate of advance $AAT_{qy}$ by the weighting factor X, multiplying the individual rate of advance $AAT_c$ of the last-dequeued call by the difference of the weighting factor X from one, and summing the two results, at step 302. Function 22 then stores this newly-computed average rate of advance $AAT_{qy}$ as the average rate of advance for the queue 21 in place of the formerly-stored average rate of advance for that queue 21, at step 304, and ends its execution for that particular call, at step 306.

Figure 4:
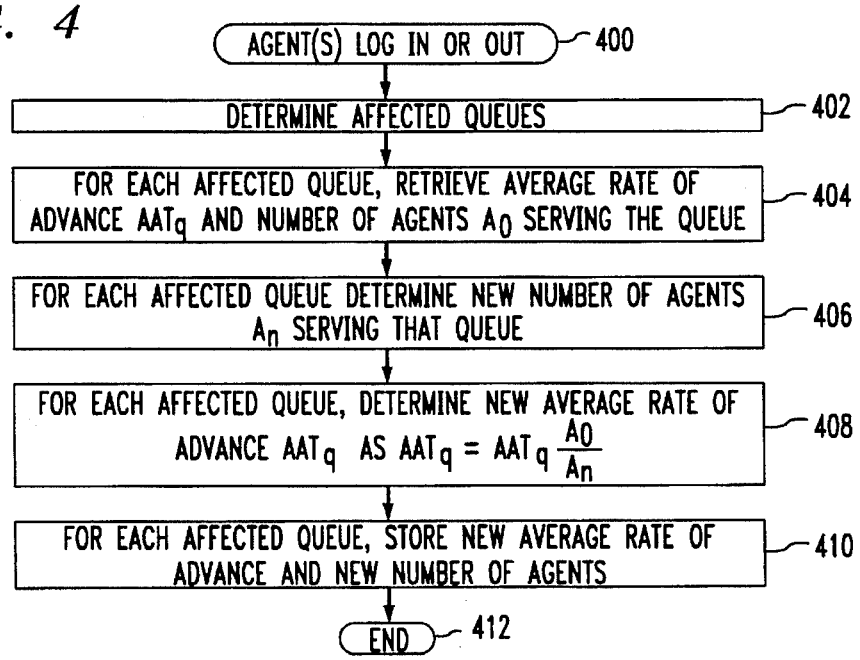

Execution of function 22 is also invoked each time one or more agents 25 log in or out of the call center of FIG. 1, as shown in FIG. 4. Upon being invoked, at step 400, function 22 determines which queues 21 are affected by the agents logging in or out, e.g., which one or more sets 20 of queues 21 the agents 25 who are logging in or out were or will be serving, at step 402. Then, function 22 retrieves the stored average rate of advance $AAT_{qy}$ for each of those affected queues 21, and also retrieves the number of agents $A_o$ that are—have up until now been—serving each of those affected queues 21, at step 404. Function 22 computes the number of agents $A_n$ that will henceforth be serving each of the affected queues 21, at step 406. Function 22 then determines a new average rate of advance $AAT_{qy}$ for each affected queue by multiplying the retrieved average rate of advance $AAT_{qy}$ for that queue 21 by the ratio of the number of agents $A_o$ that were serving that queue 21 to the number of agents $A_n$ that will be serving that queue 21, at step 408. Function 22 then stores these newly-computed average rates of advance $AAT_{qy}$ and new numbers of serving agents $A_n$ for the affected queues 21 in place of the previously-stored values of $AAT_{qy}$ and $A_o$, respectively, at step 410, and ends its execution, at step 412.

Figure 5:
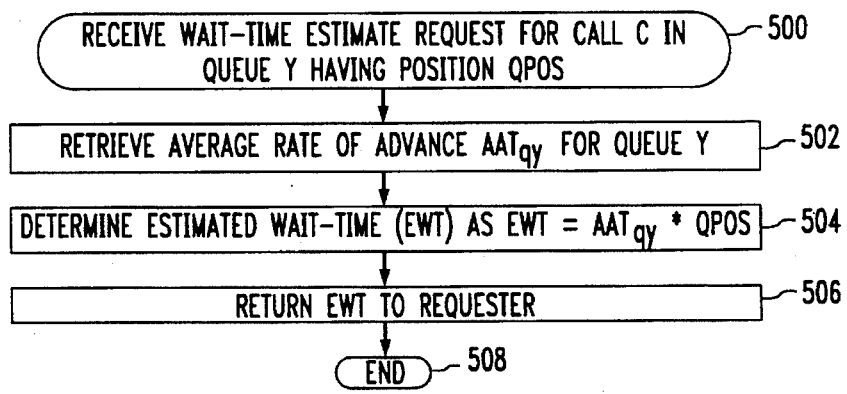

Execution of function 22 is also invoked each time that the call center of FIG. 1 has a need to determine an estimated wait time for a particular call or for a particular queue 21, as shown in FIG. 5. Such a need may arise as a consequence of the information-gathering and report-generation activities of CMS 13, or as a consequence of the operation of a call-routing or a call-vectoring arrangement. Also, VRS 14 requires this information each time that it is requested to provide a wait-time update to a call, so that it can announce to the caller the estimated waiting time until the call will be serviced.

In response to receiving a wait-time estimate request for a call that presently has, or would have upon being enqueued, a particular position QPOS in a particular queue 21, at step 500, function 21 retrieves the stored average rate of advance $AAT_{qy}$ for that queue 21, at step 502. Function 22 then determines the present estimated wait time EWT for the call by multiplying the retrieved average rate of advance $AAT_{qy}$ by the call's position QPOS in the queue 21, at step 504. Function 22 then reports the result to the requestor, at step 506, and ends its execution, at step 508.

Of course, various changes and modifications to the illustrative embodiment described above will be apparent to those skilled in the art. For example, a call may be in multiple queues simultaneously, in which case the EWT will be calculated for each of those queues and the shortest of those EWTs will be considered to be the call's EWT. Also, the EWT may be used to throttle calls and prevent them from being enqueued in overloaded queues, may be used to select the particular queue in which to enqueue the call, may be used by the network or by an ACD switch to decide which one of a plurality of alternative ACDs to send the call to, or may be used to decide what particular treatment to give to a call while it is waiting in a queue (e.g., "music-on-hold" versus an advertisement, or silence versus interactive prompting with survey questions). Such changes and modifications can be made without departing from the spirit and the scope of the invention and without diminishing its attendant advantages. It is therefore intended that such changes and modifications be covered by the following claims.

We claim:

1. A method of estimating a waiting time of a particular item in a queue of items, comprising the steps of:

determining, for each of a plurality of items in the queue, an amount of time that the item takes to advance a position in the queue;

averaging the determined amounts of time for at least a predetermined number of the items to obtain an approximate amount of time that any item in the queue takes to advance a position in the queue toward a head of the queue;

multiplying the approximate amount of time by a number of the position in the queue that the particular item does or would occupy to obtain an estimated waiting time in the queue of the particular item; and reporting the obtained estimated waiting time to a requestor.

2. The method of claim 1 wherein:

the step of determining, for each of a plurality of items, an amount of time comprises the steps of in response to each said item being enqueued, recording a time at which the item was enqueued and a number of an initial position of the item in the queue;

in response to each said item being dequeued, noting a time at which the item was dequeued;

for each said item, subtracting the recorded time for said item from the noted time for said item, to obtain a difference; and for each said item, dividing the obtained difference by the number of the initial position of said item to obtain the amount of time that said item takes to advance a position in the queue.

3. The method of claim 1 wherein:

the step of averaging comprises the steps of determining an average amount of time that it takes to advance a position in the queue toward the head of the queue, for items that have been enqueued in the queue prior to an individual item;

multiplying the average amount of time by a weighting factor smaller than one to obtain a first result;

multiplying the amount of time that the individual item takes to advance a position in the queue by a difference of the weighting factor from one, to obtain a second result; and summing the first and the second results to obtain an average amount of time that it takes to advance a position in the queue for items including the individual item, to serve as the approximate amount of time.

4. The method of claim 3 wherein the weighting factor lies within a range of 0.95 to 0.97.

5. The method of claim 1 in a system wherein logged-in agents serve items that are dequeued from the queue, wherein:

the step of multiplying comprises the steps of in response to an agent logging in or out, multiplying the determined approximate amount of time by a ratio of a number of agents that served the queue prior to the agent logging in or out and a number of agents that serve the queue subsequently to the agent logging in or out, to obtain a new approximate amount of time; and multiplying the new approximate amount of time by a number of the position in the queue that the particular item does or would occupy, to obtain the estimated waiting time in the queue of the particular item.

6. The method of claim 1 in a system having a plurality of separate queues, wherein:

the steps of determining, multiplying, and reporting are separately and independently performed for each one of the plurality of queues.

7. A method of estimating a waiting time of a particular call in any of a plurality of queues of calls, comprising the steps of:

in response to each of a plurality of calls being enqueued in any corresponding queue, recording a time at which the call was enqueued in the corresponding queue and a number of an initial position of the call in the corresponding queue;

in response to each of said plurality of calls being dequeued from any corresponding queue, noting a time at which the call was dequeued from the corresponding queue;

for each of said dequeued calls, subtracting the recorded time at which the call was enqueued from the noted time at which the call was dequeued to obtain a corresponding difference;

for each of said dequeued calls, dividing the obtained corresponding difference by the number of the initial position of the call in the corresponding queue to obtain the amount of time that the call took to advance one position in the corresponding queue;

for each individual one of said dequeued calls, multiplying an average amount of time that it took to advance one position in the corresponding queue, determined for calls that have been dequeued from the corresponding queue prior to the individual call, by a weighting factor smaller than one, to obtain a corresponding first result;

for each individual one of said dequeued calls, multiplying the amount of time that the individual call took to advance one position in the corresponding queue by a difference of the weighting factor from one, to obtain a corresponding second result;

for each individual one of said dequeued calls, summing the corresponding first and the corresponding second results to obtain an up-to-date average amount of time that it takes to advance a position in the corresponding queue for calls including the individual dequeued call;

in response to a request for an estimated waiting time of the particular call in a corresponding queue, multiplying the up-to-date average amount of time for the corresponding queue by a number of the position that the particular call does or would occupy in the corresponding queue to obtain the estimated waiting time of the particular call; and reporting the obtained estimated waiting time to the requestor.

8. The method of claim 7 in a call-answering system wherein logged-in agents serve calls that are dequeued from the queues, further comprising the steps of:

in response to an agent logging in or out, determining ones of the queues served by the logging in or logging out agent; and for each determined one of the queues, multiplying the up-to-date average amount of time that it takes to advance a position in the corresponding queue by a ratio of a number of agents that served the queue prior to the agent logging in or out and a number of agents that serve the corresponding queue subsequently to the agent logging in or out, to obtain a new said up-to-date average amount of time.

9. An arrangement for estimating a waiting time of a particular item in a queue of items, comprising:

means for determining, for each of a plurality of items in the queue, an amount of time that the item takes to advance a position in the queue;

means for averaging the determined amounts of time for at least a predetermined number of the items to obtain an approximate amount of time that any item in the queue takes to advance a position in the queue toward a head of the queue;

means for multiplying the approximate amount of time by a number of the position in the queue that the particular item does or would occupy to obtain an estimated waiting time in the queue of the particular item; and means for reporting the obtained estimated waiting time to a requestor.

10. The arrangement of claim 9 wherein:

the means for determining, for each of a plurality of items, an amount of time comprise means responsive to each said item being enqueued, for recording a time at which the item was enqueued and a number of an initial position of the item in the queue;

means responsive to each said item being dequeued, for noting a time at which the item was dequeued;

means for subtracting, for each said item, the recorded time for said item from the noted time for said item, to obtain a difference; and means for dividing, for each said item, the obtained difference by the number of the initial position of said item to obtain the amount of time that said item takes to advance a position in the queue.

11. The arrangement of claim 9 wherein:

the averaging means comprise means for determining an average amount of time that it takes to advance a position in the queue toward the head of the queue, for items that have been enqueued in the queue prior to an individual item;

means for multiplying the average amount of time by a weighting factor smaller than one to obtain a first result;

means for multiplying the amount of time that the individual item takes to advance a position in the queue by a difference of the weighting factor from one, to obtain a second result; and means for summing the first and the second results to obtain an average amount of time that it takes to advance a position in the queue for items including the individual item, to serve as the approximate amount of time.

12. The arrangement of claim 11 wherein the weighting factor lies within a range of 0.95 to 0.97.

13. The arrangement of claim 9 for a system wherein logged-in agents serve items that are dequeued from the queue, wherein:

the multiplying means comprise means responsive to an agent logging in or out, for multiplying the determined approximate amount of time by a ratio of a number of agents that served the queue prior to the agent logging in or out and a number of agents that serve the queue subsequently to the agent logging in or out, to obtain a new approximate amount of time; and means for multiplying the new approximate amount of time by a number of the position in the queue that the particular item does or would occupy, to obtain the estimated waiting time in the queue of the particular item.

14. The arrangement of claim 9 for a system having a plurality of separate queues, wherein:

the determining, multiplying, and reporting means perform their functions separately and independently for each one of the plurality of queues.

15. The arrangement of claim 9 wherein the items are calls.

16. The arrangement of claim 15 further comprising:

means for receiving calls;

means for distributing received calls to available call-answering stations;

a memory forming the queue; and means responsive to none of the call-answering stations being available when a call is received, for placing the received call in the queue.

17. An arrangement for estimating a waiting time of a particular call in any of a plurality of queues of calls, comprising:

means responsive to each of a plurality of calls being enqueued in any corresponding queue, for recording a time at which the call was enqueued in the corresponding queue and a number of an initial position of the call in the corresponding queue;

means responsive to each of said plurality of calls being dequeued from any corresponding queue, for noting a time at which the call was dequeued from the corresponding queue;

means for subtracting, for each of said dequeued calls, the recorded time at which the call was enqueued from the noted time at which the call was dequeued to obtain a corresponding difference;

means for dividing, for each of said dequeued calls, the obtained corresponding difference by the number of the initial position of the call in the corresponding queue to obtain the amount of time that the call took to advance one position in the corresponding queue;

means for multiplying, for each individual one of said dequeued calls, an average amount of time that it took to advance one position in the corresponding queue, determined for calls that have been dequeued from the corresponding queue prior to the individual call, by a weighting factor smaller than one, to obtain a corresponding first result;

means for multiplying, for each individual one of said dequeued calls, the amount of time that the individual call took to advance one position in the corresponding queue by a difference of the weighting factor from one, to obtain a corresponding second result;

means for summing, for each individual one of said dequeued calls, the corresponding first and the corresponding second results to obtain an up-to-date average amount of time that it takes to advance a position in the corresponding queue for calls including the individual dequeued call;

means responsive to a request for an estimated waiting time of the particular call in a corresponding queue, for multiplying the up-to-date average amount of time for the corresponding queue by a number of the position that the particular call does or would occupy in the corresponding queue to obtain the estimated waiting time of the particular call; and means for reporting the obtained estimated waiting time to the requestor.

18. The arrangement of claim 17 for a call-answering system wherein logged-in agents serve calls that are dequeued from the queues, further comprising:

means responsive to an agent logging in or out, for determining ones of the queues served by the logging in or logging out agent; and means for multiplying, for each determined one of the queues, the up-to-date average amount of time that it takes to advance a position in the corresponding queue by a ratio of a number of agents that served the queue prior to the agent logging in or out and a number of agents that serve the corresponding queue subsequently to the agent logging in or out, to obtain a new said up-to-date average amount of time.

19. The arrangement of claim 17 further comprising:

means for receiving calls;

means for distributing received calls to available suitable call-answering stations;

a memory forming the plurality of queues; and means responsive to none of the call-answering stations suitable for a call being available when the call is received, for placing the received call in one of the queues.

* * * * *